(12) United States Patent
Kawai et al.

(10) Patent No.: US 7,689,102 B2
(45) Date of Patent: Mar. 30, 2010

(54) DEVICE AND METHOD FOR RECORDING PROGRAM BROADCAST SIGNAL AS DIGITAL INFORMATION

(75) Inventors: Masanori Kawai, Daito (JP); Toshihiro Takagi, Daito (JP); Manabu Yamamoto, Daito (JP); Hiroyuki Nakaya, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1198 days.

(21) Appl. No.: 10/354,384

(22) Filed: Jan. 30, 2003

(65) Prior Publication Data

US 2003/0147630 A1 Aug. 7, 2003

(30) Foreign Application Priority Data

Feb. 1, 2002 (JP) ............................ 2002-025891

(51) Int. Cl.
*H04N 7/00* (2006.01)
*H04N 5/91* (2006.01)
*H04N 7/16* (2006.01)

(52) U.S. Cl. ............................ 386/96; 386/46; 725/25; 725/141; 725/142

(58) Field of Classification Search .................. 725/25, 725/141–142; 386/46, 95
See application file for complete search history.

(56) References Cited

U.S. PATENT DOCUMENTS

| | | | |
|---|---|---|---|
| 6,233,389 B1 | 5/2001 | Barton et al. | 386/46 |
| 7,110,662 B1 * | 9/2006 | Heo | 386/125 |
| 2004/0250272 A1 * | 12/2004 | Durden et al. | 725/25 |
| 2006/0026665 A1 * | 2/2006 | Rodriguez et al. | 725/135 |

FOREIGN PATENT DOCUMENTS

| | | |
|---|---|---|
| JP | 9-37168 | 2/1997 |
| JP | 10-108090 | 4/1998 |
| JP | 10-322676 | 12/1998 |

(Continued)

OTHER PUBLICATIONS

Patent Abstracts of Japan, publication No. 09037168A, published Feb. 7, 1997, 1 page.

(Continued)

*Primary Examiner*—Thai Tran
*Assistant Examiner*—Daquan Zhao
(74) *Attorney, Agent, or Firm*—Osha • Liang LLP

(57) ABSTRACT

In recording contents of received broadcast programs on an HDD, the starting of a new program is detected depending on whether or not there is a change of audience restriction information which is received together with the broadcast programs. Each time a change of the audience restriction information is detected, recording of information about a new program is started. In recording, the received audience restriction information and the title of the program created by a title creating function are recorded by associating them with the recorded content of the program. Accordingly, the operation by the user for creating and allocating respective titles of programs recorded on the HDD that is required after the recording is eliminated. In a displayed list of titles for programs recorded on the HDD, the title of any program under restriction, which is determined based on the audience restriction information recorded by being associated with the title, is not displayed.

9 Claims, 11 Drawing Sheets

FOREIGN PATENT DOCUMENTS

| | | |
|---|---|---|
| JP | 2000-57653 | 2/2000 |
| JP | 2000-501273 | 2/2000 |
| JP | 2000-156835 | 6/2000 |
| JP | 2001-94928 | 4/2001 |
| JP | 2001-145033 | 5/2001 |
| JP | 2001-352517 | 12/2001 |
| JP | 2001-359050 | 12/2001 |
| WO | 01/50752 | 7/2001 |

OTHER PUBLICATIONS

Patent Abstracts of Japan, publication No. 10108090A, published Apr. 24, 1998, 1 page.

PCT National Publication Gazette, publication No. 2000-501273, published Feb. 2, 2000, 1 page.

Patent Abstracts of Japan, publication No. 2001094928A, published Apr. 6, 2001, 1 page.

Japanese Office Action for Japanese Patent Application mailed May 15, 2007, and English Translation thereof, 7 pages.

Office Action dated Sep. 4, 2007 issued by the Japanese Patent Office in corresponding Application No. 2002-025891, 3 pages.

Patent Abstracts of Japan, Publication No. 10-322676 dated Dec. 4, 1998, 1 page.

Japanese Office Action for patent application No. 2002-25891, mailed Jan. 19, 2010, 4 pages.

* cited by examiner

| EIT | 31 | 32 | 33 | 34 | 35 |
|---|---|---|---|---|---|
| 30 | PROGRAM ID | PROGRAM TITLE | AUDIENCE RESTRICTION INFORMATION | STARTING TIME | LENGTH |
| | 00T0X | ×× | 18 OR MORE | 8:00 | 1HR |
| | 00T0Y | ×○× | ALL AGES | 9:00 | 0.5HR |
| | ⋮ | ⋮ | ⋮ | ⋮ | ⋮ |

FIG.10

| | 44 | 45 | 46 | 47 | 48 | 49 |
|---|---|---|---|---|---|---|
| | STARTING TIME | ENDING TIME | PROGRAM TITLE | START ADDRESS | END ADDRESS | AUDIENCE RESTRICTION INFORMATION |
| 42 | 6:00 | 7:00 | ○○NEWS | 0x0000 | 0x0189 | ALL AGES |
| 42 | 7:00 | 8:00 | WITNESS VIOLENT GANG LEADER | 0x0190 | 0x0249 | AGE 18 OR MORE |
| 42 | 8:00 | 9:00 | ANIMATION III | 0x0250 | 0x0300 | ALL AGES |

0x0000 — ○○NEWS — 0x0190 — WITNESS VIOLENT GANG LEADER — 0x0250 — ANIMATION III — 0x0300

AUDIENCE INFORMATION INDICATING AGE 20 OR MORE

AUDIENCE INFORMATION INDICATING AGE UNDER 15

DEVICE AND METHOD FOR RECORDING PROGRAM BROADCAST SIGNAL AS DIGITAL INFORMATION

BACKGROUND OF THE INVENTION

1. Field of the Invention

The present invention relates to a digital recording device and a digital recording method for recording a received program broadcast signal as digital information (hereinafter referred to as digital recording). In particular, the present invention relates to digital recording device and method allowing a program to be entitled in parallel with recording of the program.

2. Description of the Background Art

In recent years, a system has been in wider use for converting a television signal into a digital form which is transmitted to and received in each household. Japanese Patent Laying-Open No. 9-37168, for example, discloses an electronic-program-guide display control device. As for this device, when a program selection is made while a received program is being displayed, a data stream is simultaneously displayed, based on a received EPG (electronic program guide), that is constituted of respective scale-down images for a plurality of, for example, five programs. A cursor may be moved to designate and select a desired scale-down image. At this time, depending on whether or not the user releases a parental rock, control is done over whether a scale-down image of a program in the adult category is selected or not (not displayed at all). A resultant characteristic here is that, restriction is simply and clearly imposed on viewing of programs, since a scale-down image of the electronic program guide is selected according to identification of the viewer based on the parental rock.

Japanese Patent Laying-Open No. 10-108090 discloses a program guide display device. The program guide display device receives digital television broadcasts from a satellite, extracts, from contents of the received broadcasts, program-related information (e.g. channel, title of the program, starting time, ending time, rating information, charge information) for displaying program contents program by program, and records the extracted information regarding the program in a memory as program data. The rating information includes such information as NR (no restriction), PG (parental guidance), and PG-13 (parental guidance for children under 13).

Titles are displayed in a manner which is changed according to the value of a display flag for the program. If the user sets a limit on the charge at 5 dollars and sets the rating information of PG-13, these setting details are compared with program data for each program. According to the comparison, the display color for the title is changed on a program guide screen. A resultant characteristic is that, the user may only view the program guidance screen to identify, at a glance, viewable programs and non-viewable programs under this setting.

Japanese Patent National Publication No. 2000-501273 (WO98/38797) discloses a device which generates a television program guide using icons. Specifically, when a signal transmitted from a broadcast station is received to generate a program guide based on data of a program list included in the received content, a restriction standard entered by the viewer is compared with the data of the program list to determine whether or not a "lock" icon (relevant program is available but restricted currently) is put on each program and displayed. According to the determination, a "lock" icon is set and displayed. Consequently, the viewer can readily and immediately identify whether or not a program or channel is restricted in watching.

Japanese Patent Laying-Open No. 2001-94928 discloses a digital television broadcast recording device. The device captures and records, on a large-capacity hard disk device, such information as images of digital television broadcasts selected by tuning. In this recording, a management table is produced. On the management table, information about a viewer having recorded a program as well as a replay permission flag for permitting other viewers to replay the program are recorded for each program. The replay permission flag can be set externally for each of other viewers and thus the viewer having recorded the program surely inhibits other viewers to replay the recorded program without permission.

Further, U.S. Pat. No. 6,233,389B1 discloses a system which records information about a received digital television broadcast on a hard disk while separately recording rating information all the time that is received in parallel with the information about the broadcast. In this way, in parallel with recording of the program, rating information can be recorded as well.

As seen from the above-mentioned publications, it has been made possible to record and replay digital television signals by the digital recording device including a large-capacity memory such as hard disk device (hereinafter referred to as HDD) which has remarkably been decreased in cost and increased in capacity. The large storage capacity of the digital recording device allows large-capacity data to be recorded.

Contents refer to a group of data stored on the HDD and the contents are managed title by title. In a conventional manner, one title is allocated to one content with its beginning at the start of recording and its ending at the end thereof. If the content of one title includes data of a plurality of programs, the user has to newly create titles, program by program, and assign the titles to the programs after recording the content, which is troublesome for the user.

None of the publications above teaches digital recording of television broadcasts that is managed by creating titles program by program and allocating the created titles to respective programs.

SUMMARY OF THE INVENTION

One object of the present invention is to provide a digital recording device and a digital recording method allowing program contents to be recorded while creating titles program by program and allocating the titles to respective programs.

In order to achieve the above object, according to one aspect of the present invention, a digital recording device includes a digital recording unit having digital information recorded thereon, a title creating unit inputting a received program broadcast signal for creating, based on the input program broadcast signal, a title for each of programs that are broadcast in time sequence, and a recording portion inputting the received program broadcast signal for recording on the digital recording unit, for each of the programs broadcast in time sequence, content data indicating a content of the program and the title of the program that is created by the title creating unit, by associating them with each other.

In recording broadcast programs on the digital recording unit, the above-discussed digital recording device records content data and the corresponding title which is created in parallel with the recording, for each of the programs.

Preferably, the recording portion of the digital recording device includes a program change detecting unit inputting the received program broadcast signal for detecting, according to a change of audience restriction information for imposing a restriction as to viewers of programs included in the input program broadcast signal, that a broadcast program is changed to another program.

The program change detecting unit of the above-discussed digital recording device detects, according to a change of the audience restriction information included in the received program broadcast signal, that recording of a new program is started. Thus, without special operation, a program which requires its title to be created is readily distinguished from other programs.

Preferably, the recording portion records on the digital recording unit, when the program change detecting unit detects that the broadcast program is changed to another program, the audience restriction information after the change by associating the audience restriction information with the title of that another program after the change.

The above-discussed digital recording device records, for each program, content data, the title of the program and audience restriction information that are associated with the program. Thus, through recording of programs, centralized management of the content data, titles and audience restriction information is accomplished on the digital recording unit.

Preferably, the digital recording device further includes a title display unit for displaying the title in a list, the title being recorded on the digital recording unit.

The above-discussed digital recording device displays a list of titles for programs recorded on the digital recording unit to allow the programs recorded on the digital recording unit to be recognized at a glance.

Preferably, the title display unit of the digital recording device makes a comparison between audience information which is input in advance and which indicates information concerning a viewer of programs and the audience restriction information for each of the programs recorded on the digital recording unit and, when the title display unit determines from the comparison that a restriction is imposed on viewing by the viewer of the program associated with the audience restriction information, the title display unit makes the title associated with the audience restriction information on non-display.

In displaying the list of titles, the above-discussed digital recording device does not display the title of any program under restriction as to viewing thereof by the viewer. Accordingly, such a disadvantage is prevented that one cannot know in advance of the replay of the content data of any program recorded on the digital recording unit, whether or not the program is under restriction on viewing of the program. Moreover, it is also prevented that the title of any program (under restriction on replay) is erroneously designated for replay thereof.

Preferably, the title creating unit includes a program specifying unit for specifying each of programs with respective titles to be created, based on the input program broadcast signal.

Preferably, the program specifying unit specifies each of programs based on information indicating a broadcast starting time for each of programs in the input program broadcast signal. In this case, ATSC signal may be applied as the program broadcast signal.

Preferably, the program specifying unit specifies each of programs based on audience restriction information in the input program broadcast signal. In this case, NTSC signal may be applied as the program broadcast signal.

A hard disk unit may be applied as the digital recording unit. As the large-capacity hard disk device is applicable, a large amount of program information can be recorded.

In order to achieve the above-described object, a digital recording device according to another aspect of the invention includes a digital recording unit having digital information recorded thereon, a title creating unit, a program change detecting unit, a recording portion, and a title display unit.

The title creating unit inputs a received program broadcast signal for creating, based on the input program broadcast signal, a title for each of programs that are broadcast in time sequence. The program change detecting unit inputs the received program broadcast signal for detecting, according to a change of audience restriction information for imposing a restriction as to viewers of programs included in the input program broadcast signal, that a broadcast of a new program is started. The recording portion records, when the program change detecting unit detects that the broadcast of the new program is started, content data indicating a content of the program, the title of the program that is created by the title creating unit and the audience restriction information after the change, by associating the content data, the title and the audience restriction information with each other.

The title display unit displays the title in a list, the title being recorded on the digital recording unit. The title display unit makes a comparison between audience information which is input in advance and which indicates information concerning a viewer of programs and the audience restriction information for each of the programs recorded on the digital recording unit and, when the title display unit determines from the comparison that a restriction is imposed on viewing by the viewer of the program associated with the audience restriction information, the title display unit makes the title associated with the program on non-display.

In order to achieve the above-described object, a digital recording method according to still another aspect of the invention includes a title creating step and a recording step. In the title creating step, a received program broadcast signal is input to create, based on the input program broadcast signal, a title for each of programs broadcast in time sequence. In the recording step, the received program broadcast signal is input to record, on a prepared digital recording unit, for each of the programs broadcast in time sequence, content data indicating a content of the program and the title of the program created by the title creating step, by associating them with each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8-10 show exemplary contents recorded on the HDD 8 for recording programs broadcast as shown in FIG. 7.

DESCRIPTION OF THE PREFERRED EMBODIMENTS

Embodiments of the present invention are now described in conjunction with the drawings.

First Embodiment

Figure 1:
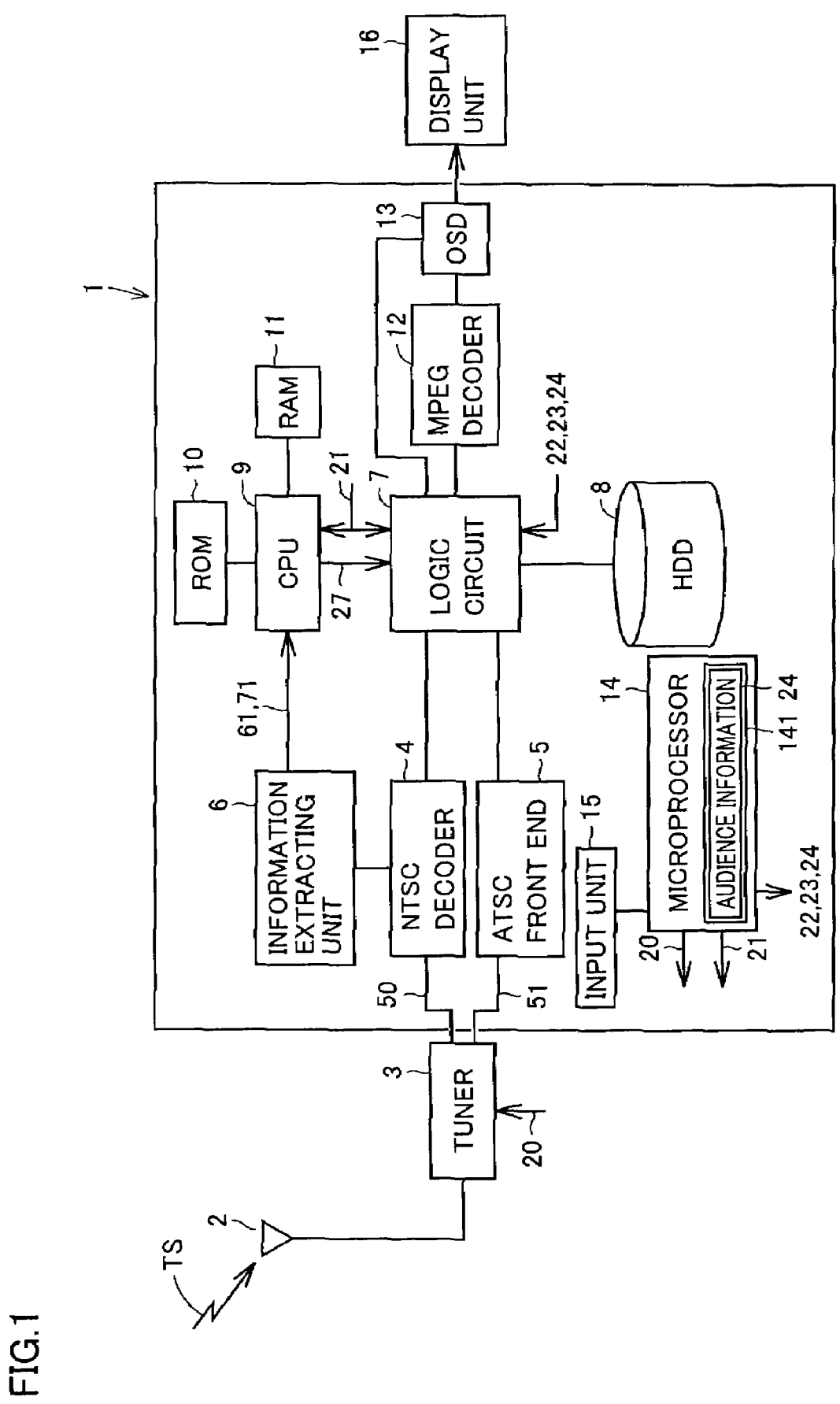
FIG. 1 shows a structure of a digital recording device according to embodiments each of the present invention, together with the periphery of the device.

FIG. 1 shows a structure of a digital recording device together with the periphery thereof according to the embodiments each of the present invention. Digital recording device 1 shown in FIG. 1 processes a television broadcast signal of NTSC (National Television System Committee standard) corresponding to the existing analog broadcast (the signal is hereinafter referred to as NTSC signal) as well as a television broadcast signal of ATSC (Advanced Television Systems Committee) corresponding to the digital broadcast (the signal is hereinafter referred to as ATSC signal).

The NTSC signal is a broadcast signal to which a broadcast station inserts audience restriction information on the 21st scan line according to the line 21 system defined by EIA-608. The signal, if transmitted from the broadcast station, may include program information regarding a program (information indicating title, broadcast time for example) inserted onto the 21st scan line. As for the ATSC signal, a broadcast signal is transmitted from a broadcast station together with an EIT (Event Information Table), which is defined by A/65, once in every 500 msec, for example.

Figures 2, 3:
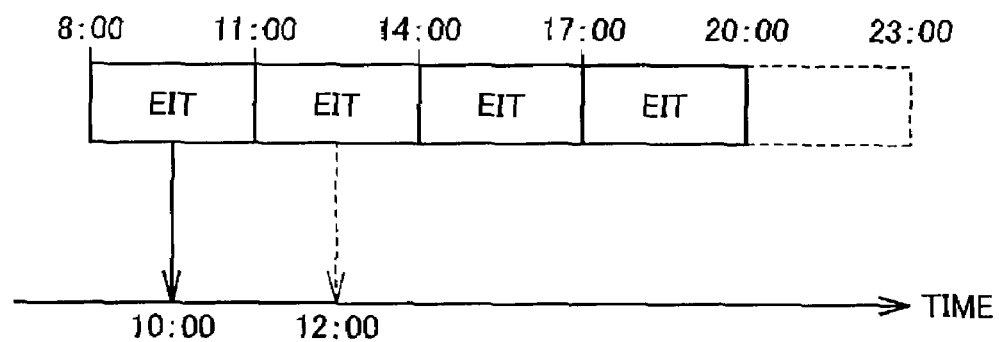
FIG. 2 shows exemplary transmission of EITs according to a first embodiment of the present invention.
FIG. 3 shows exemplary contents of the EIT according to the first embodiment of the present invention.

As shown in FIG. 2, one EIT includes data concerning programs for three hours (hereinafter referred to as program data). The broadcast station transmits program data for twelve hours and accordingly four EITs are usually transmitted. For example, referring to FIG. 2, suppose that the present time is 10:00, then four corresponding EITs are transmitted in the period from 8:00 to 20:00. At the present time of 12:00, the EIT of 8:00-11:00 is not transmitted and thus four corresponding EITs are transmitted in the period from 11:00-23:00.

FIG. 3 shows exemplary contents of the EIT. The EIT includes program data 30 for each program which is broadcast in the corresponding time frame. Program data 30 includes a program ID (Identification) 31 for identifying the corresponding program, data 32 indicating the title of the program, audience restriction information 33, data 34 indicating the broadcast starting time of the program, and data 35 indicating the length of time for which the program is broadcast.

Referring to FIG. 1, a television broadcast signal TS is received by an antenna 2, a signal for a program which is broadcast on a desired channel is extracted by a tuner 3 from the broadcast signal TS and the extracted signal is supplied to digital recording device 1. Digital recording device 1 processes the supplied signal to allow an image to be output on a display unit 16 such as television receiver connected to digital recording device 1 or digitally records the signal within the device. Although only the display unit 16 is provided here for image output, it is supposed that an audio output unit (not shown) is provided as well. Antenna 2 is capable of receiving the analogue NTSC signal and the ATSC signal.

Digital recording device 1 includes an NTSC decoder 4, an ATSC front end 5, an information extracting unit 6 including a microcomputer (not shown), a logic circuit 7, an HDD 8, a CPU (Central Processing Unit) 9, a ROM (Read-Only Memory) 10 and a RAM (Random-Access Memory) 11 connected to CPU 9, an MPEG (Motion Picture Experts Group) decoder 12, an OSD (On Screen Display) 13, a microprocessor 14 storing audience information 24 discussed later in an internal memory 141, and an input unit 15.

Input unit 15 inputs information on instructions of the user that are entered from a user-operable panel (not shown) by the user, or receives a signal indicating information on instructions of the user that is received from a user-operable remote controller (not shown) and outputs the instruction information or signal to microprocessor 14.

Microprocessor 14 inputs the information supplied from input unit 15. If the input information indicate a receiving channel desired and thus selected by the user, microprocessor 14 outputs a channel signal 20 indicative of the user-desired channel, based on the input information. If the input information indicate an instruction to record, microprocessor 14 outputs a recording instruction signal 22 for instructing to record based on the input information. If the input information indicate an instruction to display the title of a program, microprocessor 14 outputs a title display instruction signal 22 as well as audience information 24. Here, the title display instruction signal 22 represents an instruction to operate for displaying the title based on the input information. If the input information indicate an instruction to replay recorded information, microprocessor 14 outputs a replay instruction signal 23 for instructing to replay based on the input information.

Channel signal 20 is provided to tuner 3. Recording instruction signal 21 is supplied to CPU 9 and logic circuit 7. Title display instruction signal 22 and replay instruction signal 23 are provided to logic circuit 7.

In operation, the NTSC or ATSC signal received via antenna 2 is supplied to tuner 3. Tuner 3 extracts, from signal supplied from antenna 2, a broadcast signal for the desired channel selected by the user, based on the supplied channel signal 20. When antenna 2 receives the NTSC signal, the signal extracted by tuner 3 is provided to NTSC decoder 4. When antenna 2 receives the ATSC signal, the signal extracted by tuner 3 is provided to ATSC front end 5.

NTSC decoder 4 inputs NTSC signal 50 supplied thereto, performs predetermined processing on the signal to convert the signal into a bit stream (digital data), and provides the bit stream to information extracting unit 6 and logic circuit 7.

ATSC front end 5 inputs ATSC signal 51 supplied thereto, performs predetermined processing on the signal to convert the signal into a bit stream, and outputs the bit stream to logic circuit 7. At this time, ATSC front end 5 obtains, from the supplied ATSC signal 51, an EIT corresponding to the present time which is measured by an internal timer (not shown), and provides the EIT to logic circuit 7.

Information extracting unit 6 inputs the bit stream supplied from NTSC decoder 4 to extract audience restriction information 61 inserted onto the 21th scan line or program information 71, and provides the extracted information to CPU 9. Program information 71 indicates program-related information.

CPU 9 inputs, when recording instruction signal 21 is provided, audience restriction information 61 or program information 71 supplied from information extracting unit 6, edits the input information according to a program or data stored in advance in ROM 10 or RAM 11, creates data 27 indicative of the title of a corresponding program, and outputs the data to logic circuit 7.

When recording instruction signal 21 is not provided, data 27 regarding the program title is not supplied to logic circuit 7. Logic circuit 7 inputs the bit stream provided from the NTSC decoder 4 or ATSC front end 5 and provides the bit stream to MPEG decoder 12. MPEG decoder 12 converts the supplied bit stream into an image signal and provides the signal to OSD 13. OSD 13 performs graphical processing on the supplied image signal and provides the resultant signal to display unit 16.

When replay instruction signal 23 is provided, logic circuit 7 reads from HDD 8 information regarding a program designated by replay instruction signal 23 and provides the read information to MPEG decoder 12. Accordingly, recorded contents of HDD 8 are reproduced and displayed on display unit 16.

When recording instruction signal 21 is provided, logic circuit 7 records the input bit stream on HDD 8 according to recording instruction signal 21. At this time, logic circuit 7 also provides the input bit stream to MPEG decoder 12. In recording operation, logic circuit 7 associates the bit stream input from NTSC decoder 4 with data 27 regarding the program title supplied from CPU 9 to record them on HDD 8. As for the bit stream input from ATSC front end 5, logic circuit 7 associates the bit stream with data 32 regarding the corresponding program title from the EIT input in parallel from ATSC front end 5, and records the associated bit stream and the program title on HDD 8.

At this time, the program title indicated by data 32 may directly be recorded on HDD 8 or may undergo special edit processing to be recorded on HDD 8.

Regarding the NTSC signal and the ATSC signal, it is considered that the audience restriction information for the same program does not change. Then, determination can be made that a program is newly started when the audience restriction information changes. In recording operation, when logic circuit 7 finds that the audience restriction information for a received television broadcast changes and accordingly detects that broadcasting of a new program is started, logic circuit 7 associates the content of the new program with a title different from that of the program having been recorded, and records the associated program and title on HDD 8.

Figure 4:
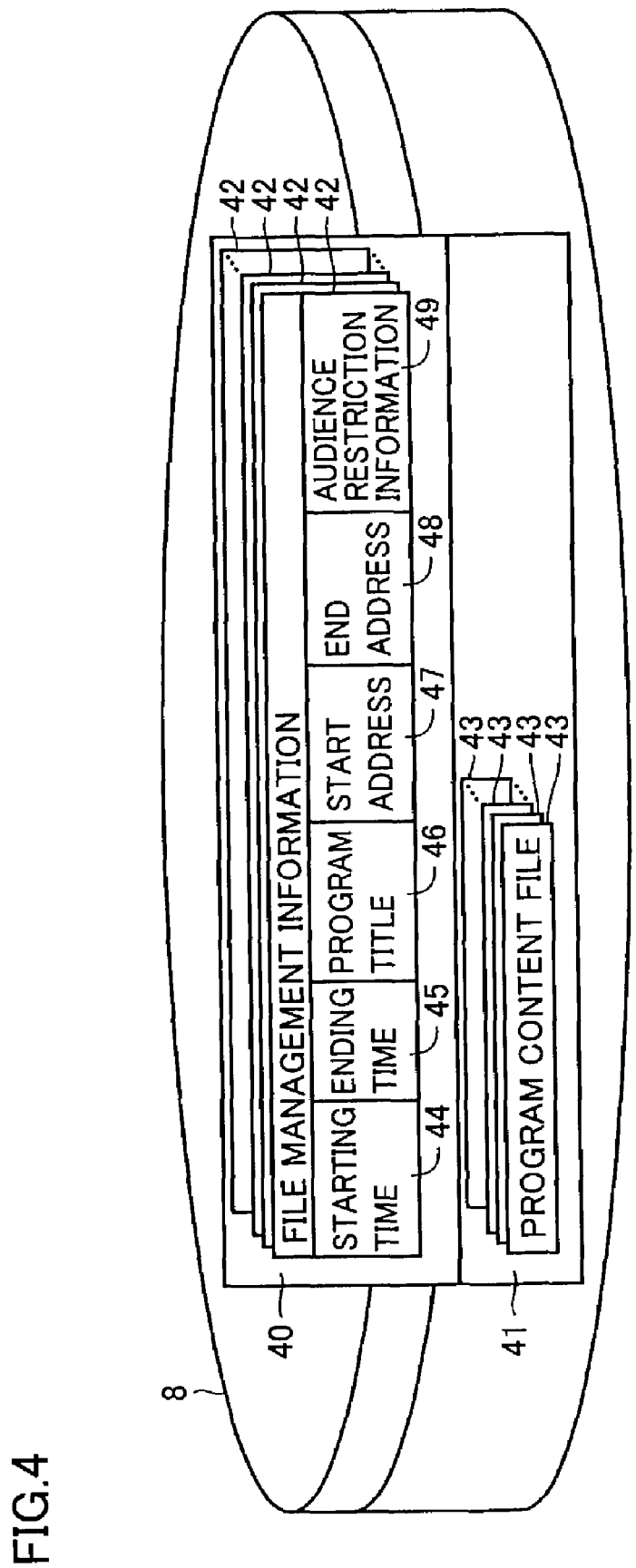
FIG. 4 shows an exemplary content recorded on an HDD 8 shown in FIG. 1.

FIG. 4 shows an exemplary content recorded on HDD 8 shown in FIG. 1. HDD 8 shown in FIG. 4 includes a file management region 40 and a recording region 41. On file management region 40, logic circuit 7 records file management information 42 for each title of a program, i.e., for each program, by associating the information with each program. On recording region 41, logic circuit 7 records bit streams, for respective corresponding programs, one by one as a program content file 43 for each title of a program, namely for each program. File management information 42 and program content file 43 are associated in one-to-one relation with each other and accordingly recorded.

File management information 42 includes data 44 and data 45 respectively indicating the starting time and the ending time of a broadcast of a relevant program, data 46 indicating the title of the program, data 47 and data 48 respectively indicating the start address and the end address in recording region 41 for the relevant program content file 43, and audience restriction information 49 of the relevant program, the data and information in the file management region being associated with each other. Data 44 indicating the starting time and data 45 indicating the ending time are obtained from the above-mentioned program information as for the NTSC signal and from the EIT as for the ATSC signal. Data 47 indicative of the start address indicates the leading address in recording region 41 of the relevant program content file 43 and data 48 indicative of the end address indicates the last address.

Figure 5A:
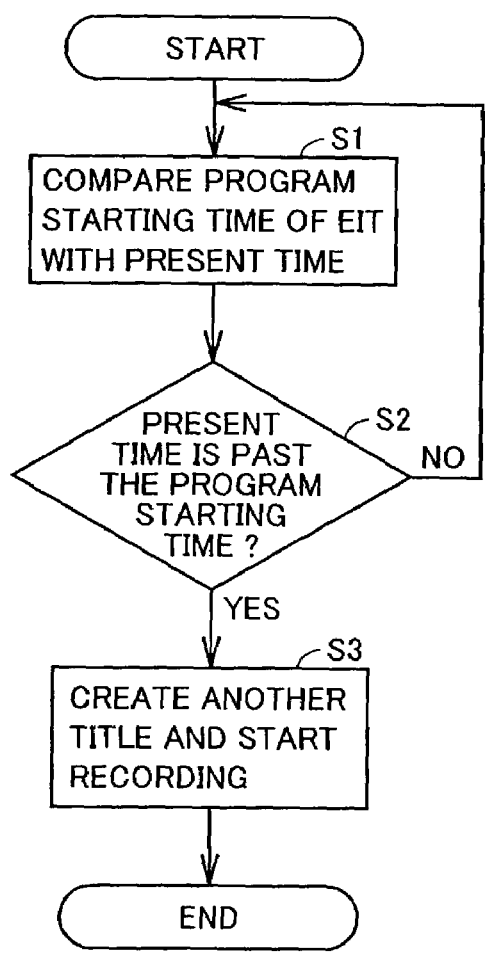
FIGS. 5A and 5B show respective process flowcharts for an ATSC signal and an NTSC signal respectively, for creating a program title in parallel with recording.
Figure 5B:
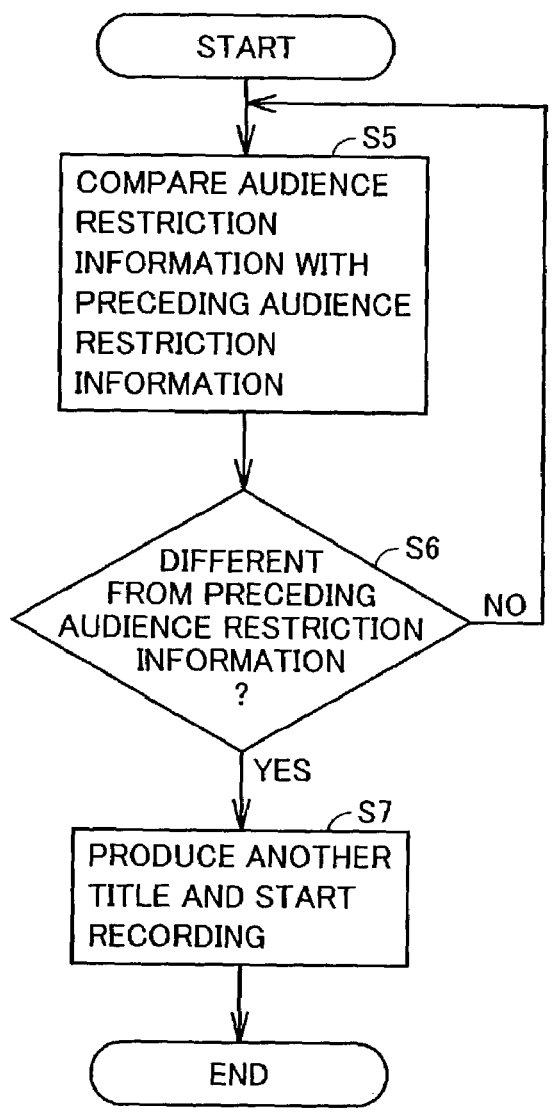

FIGS. 5A and 5B show respective process flowcharts for creating a program title in parallel with recording, for the ATSC signal of the digital broadcast and the NTSC signal of the analog broadcast respectively.

Referring to FIG. 5A, logic circuit 7 compares each starting time indicated by data 34 of the EIT supplied from ATSC front end 5 with the present time measured by the internal timer (not shown) (step S (hereinafter abbreviated as S) 1). If it is determined that the present time is past the starting time indicated by data 34, it is determined that the broadcast content changes to another program (YES in S2). Then, data 46 concerning the program title is generated according to data 32 concerning the program title associated with data 34 concerning the starting time corresponding to the present time of the supplied EIT. Then, the data 46 concerning the program title thus generated is recorded in file management information 42 for that another program and recording of program content file 43 for that another program is started (S3).

Referring to FIG. 5B, CPU 9 compares audience restriction information 61 supplied this time from information extracting unit 6 with audience restriction information 61 supplied last time (S5). If it is determined through the comparison that those are different from each other, it is determined that the broadcast content changes to another program (YES in S6). Then, CPU 9 produces data 27 regarding the title of that another program title and provides the produced program-title data 27 to logic circuit 7. Here, CPU 9 creates the title by editing for example the information provided from information extracting unit 6. Logic circuit 7 records data 46 regarding the program title that is produced from the supplied data 27 regarding the new program title, in file management information 42 for that another program, and starts recording of program content file 43 for that another program (S7).

Figure 6:
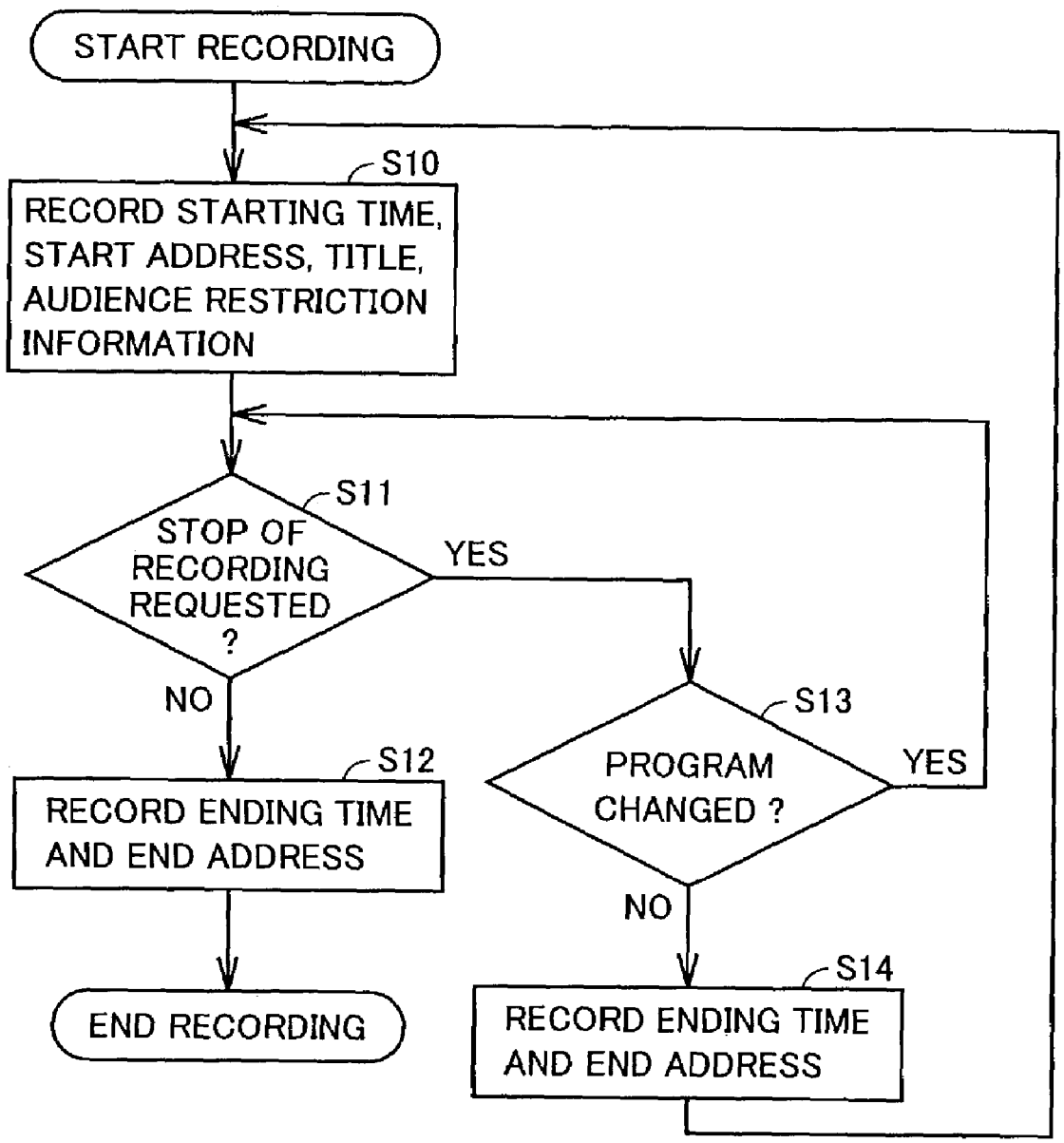
FIG. 6 shows a process flowchart for recording according to the first embodiment of the present invention.
Figure 7:
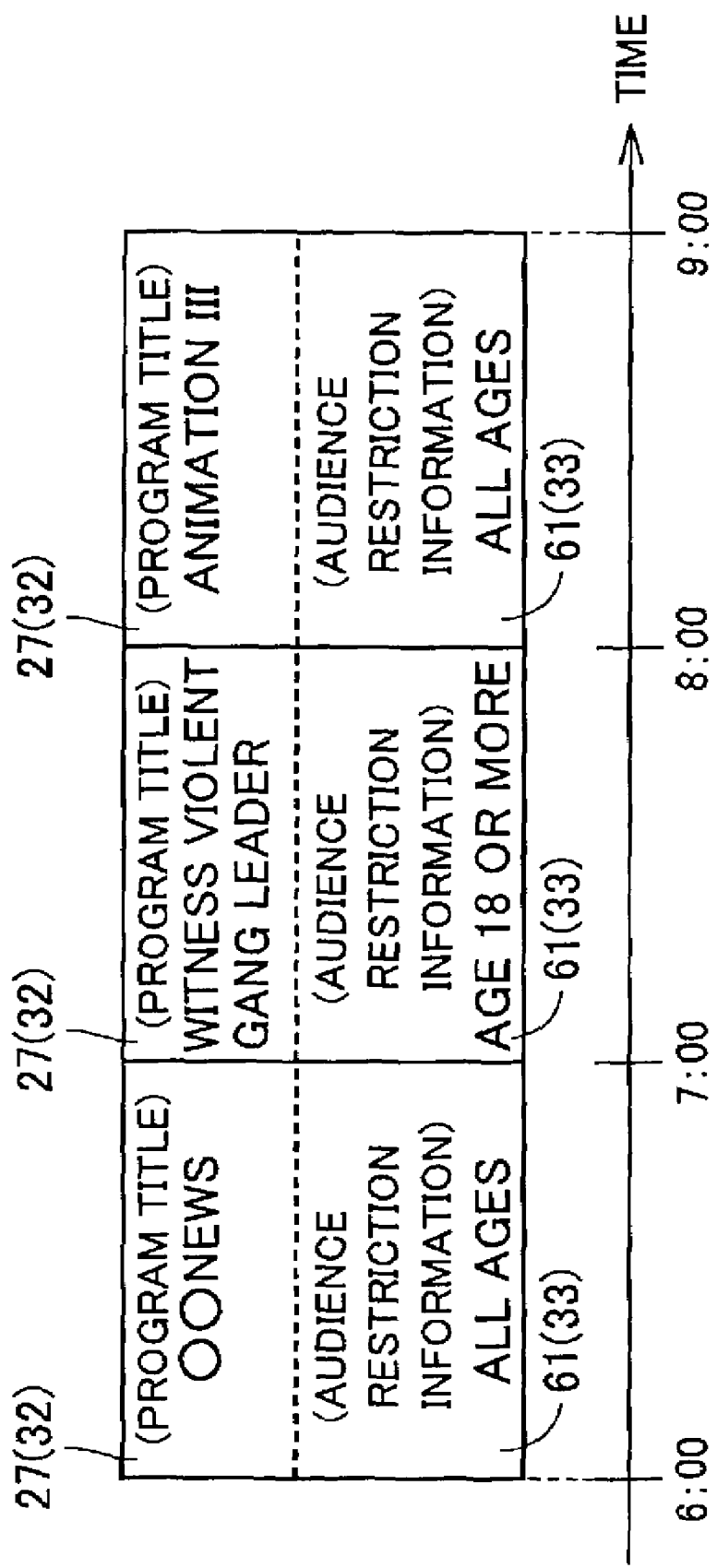
FIG. 7 shows three exemplary programs broadcast in the period from 6:00 to 9:00 according to the first embodiment of the present invention.
Figure 8:
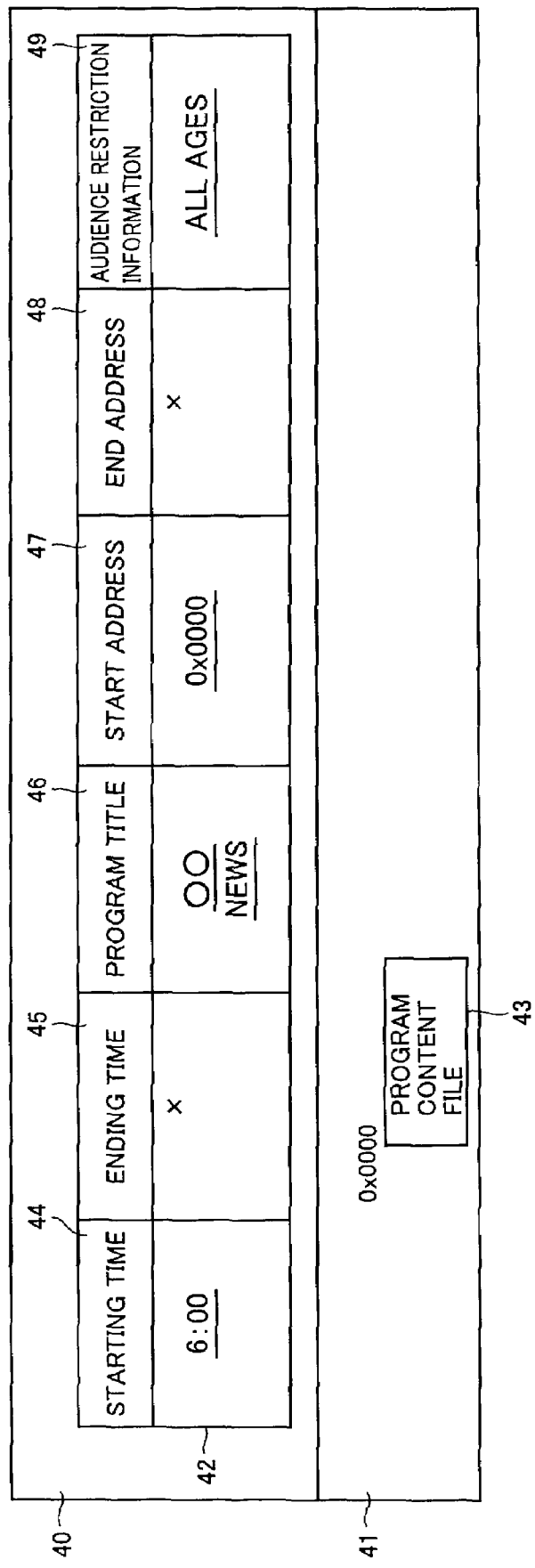
Figure 9:
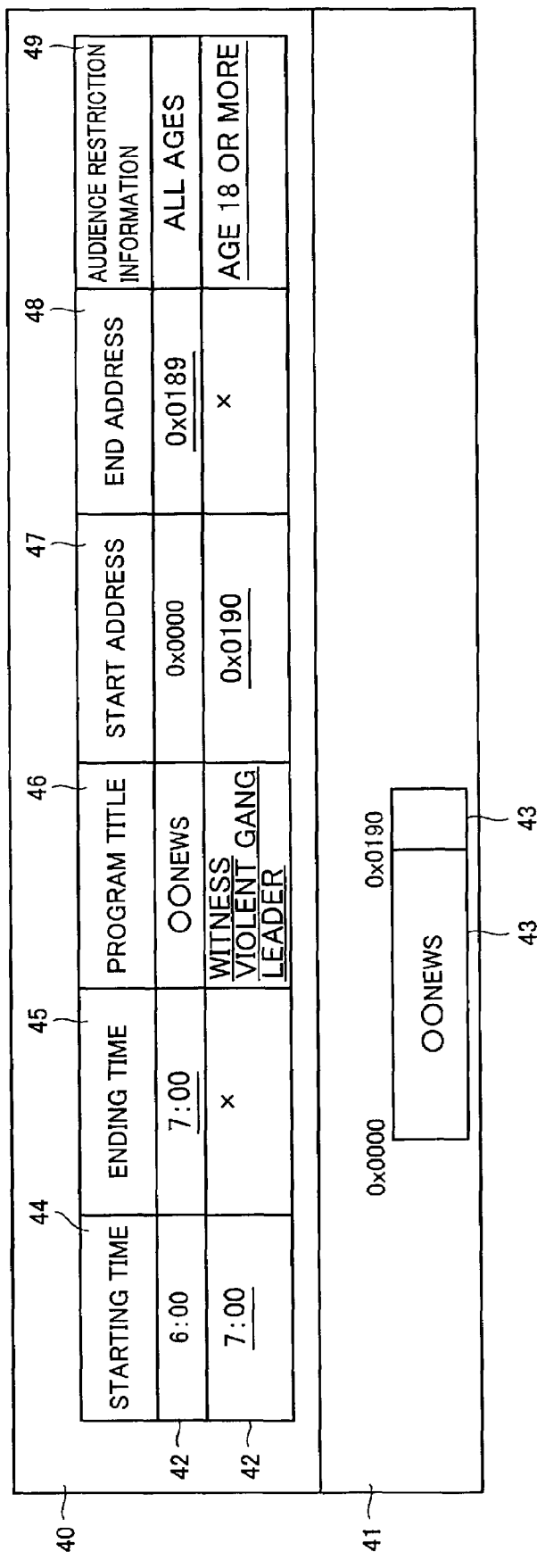

Referring to FIGS. 7-10, according to the flowchart for recording shown in FIG. 6, specific details of the recording operation are described. It is supposed here as shown in FIG. 7 that three programs that are broadcast from 6:00 to 9:00 are recorded. For the convenience of illustration, FIG. 7 shows the title indicated by data 27 (32) that is associated with the content of audience restriction information 61 (33) for each of the broadcast programs. If the programs broadcast as shown in FIG. 7 are to be recorded, contents recorded on HDD 8 change successively as shown in FIGS. 8, 9 and 10. In FIGS. 9 and 10, to each program content file 43, the title of the program indicated by relevant title data 46 is allocated for the convenience of illustration.

Recording is started at 6:00. Immediately after the start, file management region 40 and recording region 41 on HDD 8 are as shown in FIG. 8. Specifically, recording of a content of a bit stream of a program with recording thereof started from address "0x0000" in recording region 41 is started, the content corresponding here to program content file 43. At this time, relevant file management information 42 in file management region 40 is produced and, the produced file management information 42 includes data 44 concerning the recording starting time, data 46 concerning the program title, data 47 concerning the start address, and audience restriction information 49 (S10). As shown in FIG. 8, data 45 concerning the ending time and data 48 concerning the end address are not recorded at the time immediately after the start of recording.

It is thereafter determined whether or not a request for stop of the recording is entered by the user via input unit 15 for example (S11). If the recording stop request is entered (Yes in S11), data 45 regarding the ending time and data 48 regarding the end address are recorded in file management information 42 corresponding to the program being recorded (S12), and thereafter the recording operation is ended.

If no request for stop of the recording is entered (No in S11), it is determined whether or not the program changes. If it is determined based on received audience restriction information 61 (33) that no program change occurs (No in S13), the process returns to the step in S11 and thereafter the process proceeds in a similar manner.

Here, at the time past 7:00, for example, the audience restriction information 61 (33) changes as shown in FIG. 7. If the change of the audience restriction information is detected and it is determined that the program changes (Yes in S13), data 45 regarding the ending time and data 48 regarding the end address of the relevant program content file 43 are recorded in file management information 42 of the preceding program in order to indicate that the program is ended at 7:00 (S14). After this, file management information 42 for another program newly started at 7:00 is produced and, in the produced file management information 42, data 46 regarding the program title of that another program, data 44 regarding the starting time, data 47 regarding the start address and audience restriction information 49 are recorded (S10). The data on HDD 8 at this time is shown in FIG. 9. The data underlined in FIG. 9 indicate data recorded at 7:00.

Further, at the time past 8:00, a similar process to that carried out after the time 7:00 is performed. When the recording is finally ended at 9:00, data 45 regarding the ending time and data 48 regarding the end address are written in file management information 42 of the last program. Data on HDD 8 when the recording is ended is shown in FIG. 10. In FIG. 10, data added at the recording ending time is underlined.

According to the embodiment discussed above, a program broadcast signal is received while the program content file 43 as well as the title associated with the program that is created in parallel with the recording are recorded on HDD 8 for each of received programs. Accordingly, the operation of creating respective titles for programs after the recording is ended and adding those titles is eliminated.

Second Embodiment

According to a second embodiment, in displaying a list of data 46 regarding program titles allocated respectively to recorded programs, it is determined whether a title is displayed or not based on the current audience information 24, and accordingly the titles are displayed as determined.

Here, audience information 24 refers to information concerning the viewer of programs, i.e., age of the viewer, whether the viewer is an adult or not, for example. The information concerning the viewer is entered by the viewer from a front panel associated with input unit 15 or by a parent of the viewer if the viewer is a young child or infant. Then, the entered information is recorded as audience information 24 in memory 141 of microprocessor 14 via input unit 15. Preferably, memory 141 is of such a type which retains the recorded information when power is made off, for example, EEPROM (Electrically Erasable and Programmable ROM).

It is supposed here that data is recorded on HDD 8 as shown in FIG. 10 and the recorded audience information 24 indicates "age 20 or more." At this time, suppose that the user gives, through input unit 15, an instruction to display a list of respective titles of recorded programs. Microprocessor 14 then inputs the instruction, reads the audience information 24 from memory 141, and provides the read audience information 24 and title display instruction signal 22 to logic circuit 7 for displaying the list of titles.

Figure 11:
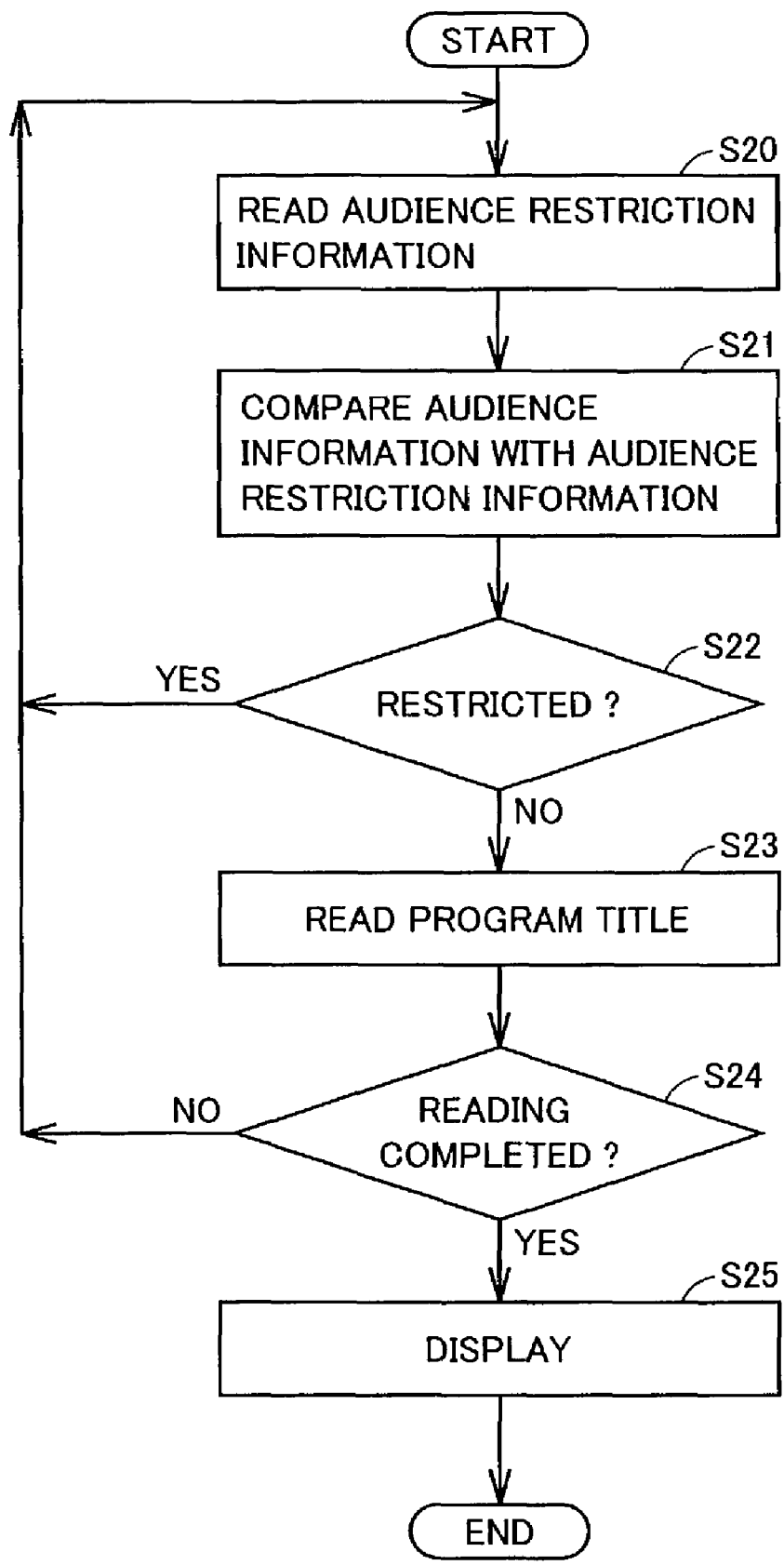
FIG. 11 is a process flowchart for listing and displaying program titles according to a second embodiment of the present invention.

Logic circuit 7 inputs title display instruction signal 22 to operate according to the flowchart in FIG. 11. Logic circuit 7 reads audience restriction information 49 recorded in file management information 42 shown in FIG. 10 (S20), and compares the read audience restriction information 49 with the supplied audience information 24 (S21). If it is determined from the comparison that audience information 24 is under audience restriction information 49 (Yes in S22), i.e., viewing is restricted, audience restriction information 49 in the following file management information 42 is read (S22) and the subsequent operation is performed in a similar manner.

If the audience information 24 is not under audience restriction information 49 (No in S22), i.e., viewing is not restricted, it is determined according to the audience information 24 that no restriction is imposed on viewing of the program associated with the file management information 42. Logic circuit 7 then reads data 46 regarding the title of program associated with the audience restriction information 49 (S23). Data 46 concerning the read program title is then supplied to OSD 13. It is thereafter determined whether or not reading of audience restriction information 49 in all file management information 42 recorded on HDD 8 is completed. If not (No in S24), audience restriction information 49 is read from the following file management information 42 (S20) and the subsequent operation is performed in a similar manner to that described.

Figure 12A:
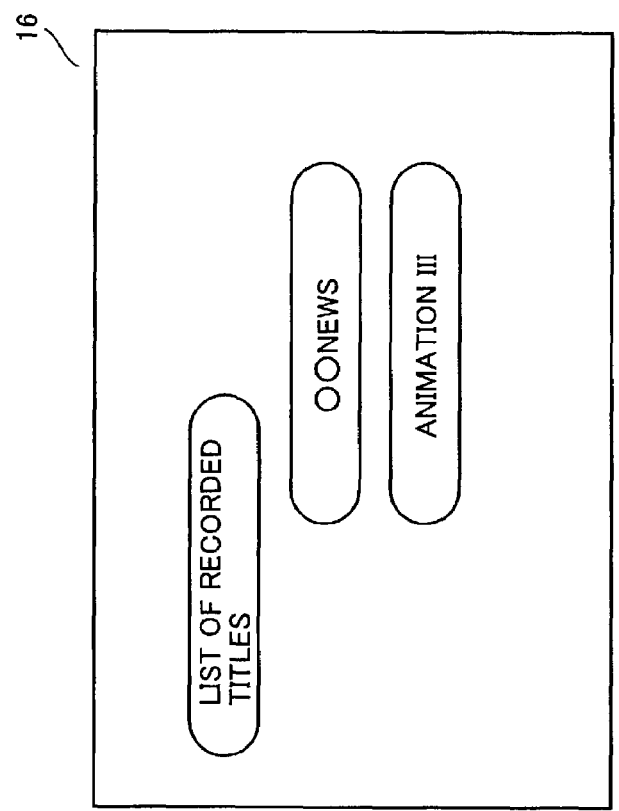
FIGS. 12A and 12B show respective exemplary screens each displaying a list of program titles according to the second embodiment of the present invention.

If the reading is completed (Yes in S24), a display operation is carried out (S25). In the display operation, OSD 13 inputs the supplied data 46 concerning the program titles to produce screen data for displaying a list of program titles and display a screen based on the screen data on display unit 16. Here, as the audience information 24 indicates "age 20 or more," the screen as shown in FIG. 12A is displayed on screen of display unit 16.

Figure 12B:
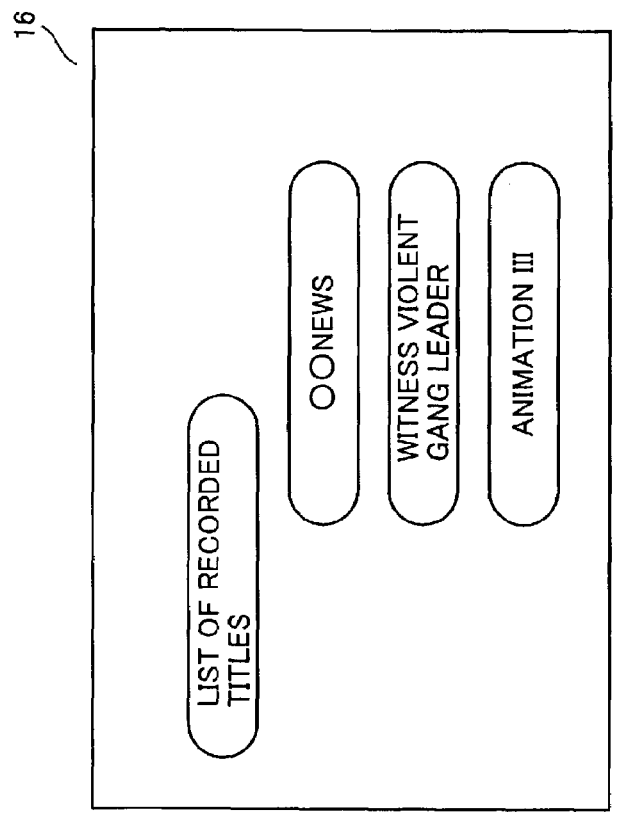

If audience information 24 which is currently entered indicates "age under 15," it is determined according to the flowchart in FIG. 11 that display of the title of the program indicated by data 46 of the second file management information 42 in FIG. 10 is inhibited (Yes in S22). In other words, it is determined from the audience information 24 that restriction is imposed on viewing of the program with this title and accordingly, logic circuit 7 reads only the data 46 of the remaining two program titles from HDD 8 and provides the read data to OSD 13. The screen with the program titles as shown in FIG. 12B is thus displayed on screen of display unit 16 by OSD 13.

According to this embodiment, when any of the programs recorded on HDD 8 is under restriction as to viewing of the program, which is determined from audience restriction information 49, the title of that program indicated by data 46 corresponding to the audience restriction information 49 is not displayed. Then, such a disadvantage is prevented that one cannot know in advance of the replay of any program, whether or not the program is under restriction on viewing of the program. Moreover, it is also prevented that the title of any program (under restriction on replay) is erroneously designated for playback thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital recording device comprising:
    a digital recording unit having digital information recorded thereon;
    title creating means inputting a received program broadcast signal for creating, based on said input program broadcast signal, a title for each of programs that are broadcast in time sequence;
    program change detecting means inputting said received program broadcast signal for detecting, according to a change of audience restriction information for imposing a restriction as to viewers of programs included in said input program broadcast signal, that a broadcast of a new program is started;
    recording means for recording, automatically according to the detection by the program change detection means, content data indicating a content of said program, the title of said program that is created by said title creating means and said audience restriction information after the change, by associating said content data, said title and said audience restriction information with each other; and
    title display means for displaying said title in a list, said title being recorded on said digital recording unit, wherein
        said title display means makes a comparison between audience information which is input in advance and which indicates information concerning a viewer of programs and said audience restriction information for each of said programs recorded on said digital recording unit and, when said title display means determines from the comparison that a restriction is imposed on viewing by the viewer of the program associated with said audience restriction information, said title display means does not display the title in the list;
    wherein said digital recording unit comprises a recording region storing program content files and a file management region storing file management information comprising said title and said audience restriction information corresponding to each of the program content files.

2. The digital recording device according to claim 1, wherein
    said recording means records on said digital recording unit, when said program change detecting means detects that the broadcast program is changed to another program, said audience restriction information after the change by associating the audience restriction information with the title of said another program after the change.

3. The digital recording device according to claim 1, wherein
    said title creating means includes program specifying means for specifying each of programs with respective titles to be created, based on said input program broadcast signal.

4. The digital recording device according to claim 3, wherein
    said program specifying means specifies each of programs based on audience restriction information in said input program broadcast signal.

5. The digital recording device according to claim 4, wherein
    said program broadcast signal is NTSC signal.

6. The digital recording device according to claim 3, wherein
    said program specifying means specifies each of programs based on information indicating a broadcast starting time for each of programs in said input program broadcast signal.

7. The digital recording device according to claim 6, wherein
    said program broadcast signal is ATSC signal.

8. The digital recording device according to claim 1, wherein
    said digital recording unit includes a hard disk device for recording said digital information.

9. A digital recording method comprising:
    a title creating step of inputting a received program broadcast signal to create, based on said input program broadcast signal, a title for each of programs broadcast in time sequence; and
    a recording step of inputting said received program broadcast signal to record on a prepared digital recording unit, for each of said programs broadcast in time sequence, content data indicating a content of the program and the title of said program created by said title creating step;
    wherein said digital recording unit comprises a recording region storing program content files and a file management region storing file management information comprising said title and audience restriction information corresponding to each of the program content files; and
    wherein said recording step includes detecting, automatically according to a change of said audience restriction information for imposing a restriction as to viewers of programs included in said input program broadcast signal, that a broadcast program is changed to another program; and
    a title display step of displaying the title in a list comprising:
        accessing the file management region;
        comparing the audience restriction information to audience information;
            wherein the audience information is input in advance and indicates information concerning a viewer of programs;
        displaying the title based on the comparison between the audience information and the audience restriction information.

* * * * *